United States Patent [19]

Kamijima

[11] Patent Number: 5,258,852
[45] Date of Patent: Nov. 2, 1993

[54] RECORDING MEDIUM AND VIDEO SIGNAL RECORDING/REPRODUCING METHOD USING A PREDETERMINED AREA OF A RECORDING MEDIUM TO RECORD INFORMATION INTENDED TO BE RECORDED IN A DEFECTIVE PORTION OF THE MEDIUM

[75] Inventor: Yoshihiro Kamijima, Saitama, Japan

[73] Assignee: Pioneer Electronic Corporation, Tokyo, Japan

[21] Appl. No.: 804,416

[22] Filed: Dec. 10, 1991

[30] Foreign Application Priority Data

Jun. 18, 1991 [JP] Japan .................................. 3-146337

[51] Int. Cl.$^5$ .............................................. H04N 5/76
[52] U.S. Cl. .................................... 358/335; 358/342; 360/53; 369/53; 369/58; 369/59
[58] Field of Search ............... 358/335, 342, 310, 322, 358/336, 314, 327; 369/53, 54, 58, 59, 110; 360/31, 53, 60

[56] References Cited

U.S. PATENT DOCUMENTS

| 4,638,472 | 1/1987 | Ogata et al. | 369/54 |
| 4,719,612 | 1/1988 | Kenjyo | 369/54 |
| 4,745,494 | 5/1988 | Kaneko et al. | 358/342 |
| 4,768,181 | 8/1988 | Ichinose et al. | 369/54 |
| 4,821,251 | 4/1989 | Hosoya | 369/58 |
| 4,833,665 | 5/1989 | Tokumitsu et al. | 369/58 |
| 4,839,879 | 6/1989 | Sawada et al. | 369/54 |
| 4,980,878 | 12/1990 | Szerlip | 369/58 |
| 5,130,969 | 7/1992 | Sako | 369/53 |

Primary Examiner—Jeffery Brier
Assistant Examiner—Thai Tran
Attorney, Agent, or Firm—Sughrue, Mion, Zinn, Macpeak & Seas

[57] ABSTRACT

A video signal recording/reproducing method comprises the steps of, before recording and reproducing of a video signal, reading out defective portion information from a recording medium information record area of a recording medium and storing the information, followed by recording and reproducing steps. The recording method includes the steps of writing the video signal into a normal record area of the recording medium, when the writing position reaches a position corresponding to the defective portion information, writing a predetermined unit of video signal into a memory and, after completion of recording of the video signal into the normal record area, reading out the video signal from the memory and writing the same video signal into a substitute record area of the recording medium. The reproduction method includes the steps of reproducing the video signal from the substitute record area and writing the same video signal into the memory, after the reproducing step, reading out the video signal from the normal record area and providing the same video signal as a reproduction signal and, when the reading position reaches a position corresponding to the defective portion information, reading out the video signal from the memory and providing the latter video signal as a reproduction signal.

5 Claims, 13 Drawing Sheets

RECORDING MEDIUM AND VIDEO SIGNAL RECORDING/REPRODUCING METHOD USING A PREDETERMINED AREA OF A RECORDING MEDIUM TO RECORD INFORMATION INTENDED TO BE RECORDED IN A DEFECTIVE PORTION OF THE MEDIUM

FIELD OF THE INVENTION

The present invention relates to a recording medium such as a video disc or similar device and, more specifically, to a method for recording and reproducing a video signal by use of the same recording medium.

BACKGROUND OF THE INVENTION

Conventionally, when a disc has a defective portion into which a signal or information cannot be recorded, if the information to be recorded is information such as text data, then a substitution track is provided as a substitute for the defective portion and the information to be written into the defective portion is written into the substitution track. During reproduction, when the defective portion is read out, a search operation is performed using the substitution track so that the recording and reproduction can be executed even when the disc has the unrecordable defective portion. Therefore, a disc having a defective portion amounting to less than a predetermined portion of the disc need not be discarded as inferior goods. Thus, the production efficiency for the discs can be enhanced.

When the record information is a video signal, however, the recorded images must be successive or continuous during reproduction. For this reason, during recording, a research operation is executed to thereby write the video signal into the substitution track while, during reproduction, if the video signal is read out by means of a search operation, then images occurring during the search operation are discontinuous. The present invention was motivated by a desire to overcome this problem.

SUMMARY OF THE INVENTION

The principal object of the present invention is to provide a recording medium with an associated recording/reproducing method for eliminating the drawbacks found in the related art. Accordingly, it is an object of the invention to provide a recording medium and a video signal recording/reproducing method using the recording medium which can provide continuous images during reproduction even if the recording medium has an unrecordable defective portion and the information to be recorded is a video signal.

A recording medium according to the present invention includes a normal record area for recording a video signal, a recording medium information record area for storing information with respect to a defective portion of the recording medium previously recorded therein, and a substitute record area for recording a video signal to be recorded in the defective portion of the recording medium or for recording a video signal representing a time necessary to jump the defective portion of the recording medium.

A video signal recording method according to the present invention provides a method for recording a video signal into a recording medium which includes a normal record area for recording a video signal, a recording medium information recording area for storing information with respect to a defective portion of the recording medium previously recorded therein, and a substitute record area for recording a video signal to be recorded in the defective portion of the recording medium. The video signal recording method according to the present invention comprises the steps of reading out the defective portion information from the recording medium information record area and storing the same defective portion information before the video signal is recorded, during recording, writing the video signal into the normal record area, when the writing position reaches a position corresponding to the defective portion information, writing into a memory a predetermined unit of video signal to be written to the defective position and, after completion of recording of the video signal into the normal record area, reading out the video signal from the memory and writing the same video signal into the substitute record area.

A video signal reproducing method according to the present invention provides a method for reproducing a video signal from a recording medium including a normal record area in which a video signal has been recorded, a recording medium information record area in which information with respect to a defective portion of the recording medium has been previously recorded, and a substitute record area in which a video signal to be recorded in the defective portion of the recording medium has been recorded. The video signal reproducing method according to the present invention comprises the steps of reading out the defective portion information from the recording medium information record area and storing the same defective portion information prior to reproduction of the video signal, during reproduction, reproducing the video signal from the substitute record area and writing the same video signal into a memory, after the reproducing step, reading the video signal from the normal record area and outputting the same video signal as a reproduction signal, when the read-out position reaches a position corresponding to the defective portion information, reading out the video signal from the memory and outputting the same video signal as the reproduction signal.

A video signal recording/reproducing method according to the present invention provides a method for recording and reproducing a video signal into and from a recording medium including a normal record area for recording a video signal, a recording medium information record area in which information with respect to a defective portion of the recording medium has been previously recorded, and a substitute record area for recording a video signal to be recorded in the defective portion of the recording medium. The video signal recording/reproducing method comprises the steps of reading out the defective portion information from the recording medium information record area and storing the same defective portion information prior to recording and reproduction of the video signal, during recording, writing the video signal into the normal record area; when the writing position reaches a position corresponding to the defective portion information, jumping the defective portion to a portion following the defective portion, writing into a memory a video signal in a predetermined unit corresponding to a time necessary for such jumping operation, after completion of recording the video signal into the normal record area, reading out the video signal from the memory and writing the same video signal into the substitute record area, during reproduction, reproducing the video signal from the substitute record area and writing the same video signal into the memory, after the reproducing step, reading out the video signal from the normal record area and outputting the same video signal as a reproduction signal, when the read-out position reaches a position corresponding to the defective portion information, jumping the defective portion to a portion following the defective portion and, reading out the video signal from the memory and outputting the same video signal as the reproduction signal in such jumping time.

These and other features, objects and advantages of the present invention are provided by a video signal recording apparatus for recording a video signal into a recording medium having a normal record area, a recording medium information record area and a substitution record area. The video signal recording apparatus includes a circuit for reading defective portion information from the recording medium information record area, a first memory for storing the read-out defective portion information, a circuit for generating first and second selection instructions when a writing position and the defective portion information are not equal to one another and are equal to one another, respectively, a device for writing the video signal into the normal record area in response to the first selection instruction, a device for writing a predetermined unit of video signal into a second memory in response to the second selection signal and a device for reading out the predetermined unit of video signal from the second memory means and writing the same video signal into the substitution record area.

According to one aspect of the present invention, the device for reading out is activated after the operation of the device for writing the video signal has ended. According to another aspect of the present invention, the predetermined unit of video signal is one of a one frame unit of video signal and one horizontal period unit of video signal.

These and other features, objects and advantages of the present invention are provided by a video signal reproducing apparatus for reproducing a video signal from a recording medium including a normal record area, a recording medium information record area and a substitution record area. The video signal reproducing apparatus includes a device for reading defective portion information from the recording medium information record area and storing the defective portion information before the video signal is reproduced, a circuit for reproducing the video signal from the substitution record area and writing the same video signal into a memory, a first circuit for reading out the video signal from the normal record area and outputting the same video signal as a reproduction signal and a second circuit for reading out the video signal from the memory and outputting the video signal from the memory as the reproduction signal. The video signal reproducing apparatus further comprises a controller for controlling the device for reproducing and the first and second circuits out so as to permit operation of the device for reproducing prior to operation of the first and second circuits and for controlling the first and second circuits so as to permit the first circuit to provide the reproduction signal when a current reading position is not equal to the defective portion information and the second circuit to provide the reproduction signal when the current reading position coincides with the defective portion information.

DETAILED DESCRIPTION OF THE PREFERRED EMBODIMENTS

A detailed description of the preferred embodiments of a recording medium and a video signal recording/reproducing method by use of the recording medium according to the present invention will be given with reference to the accompanying drawings.

Figure 1:
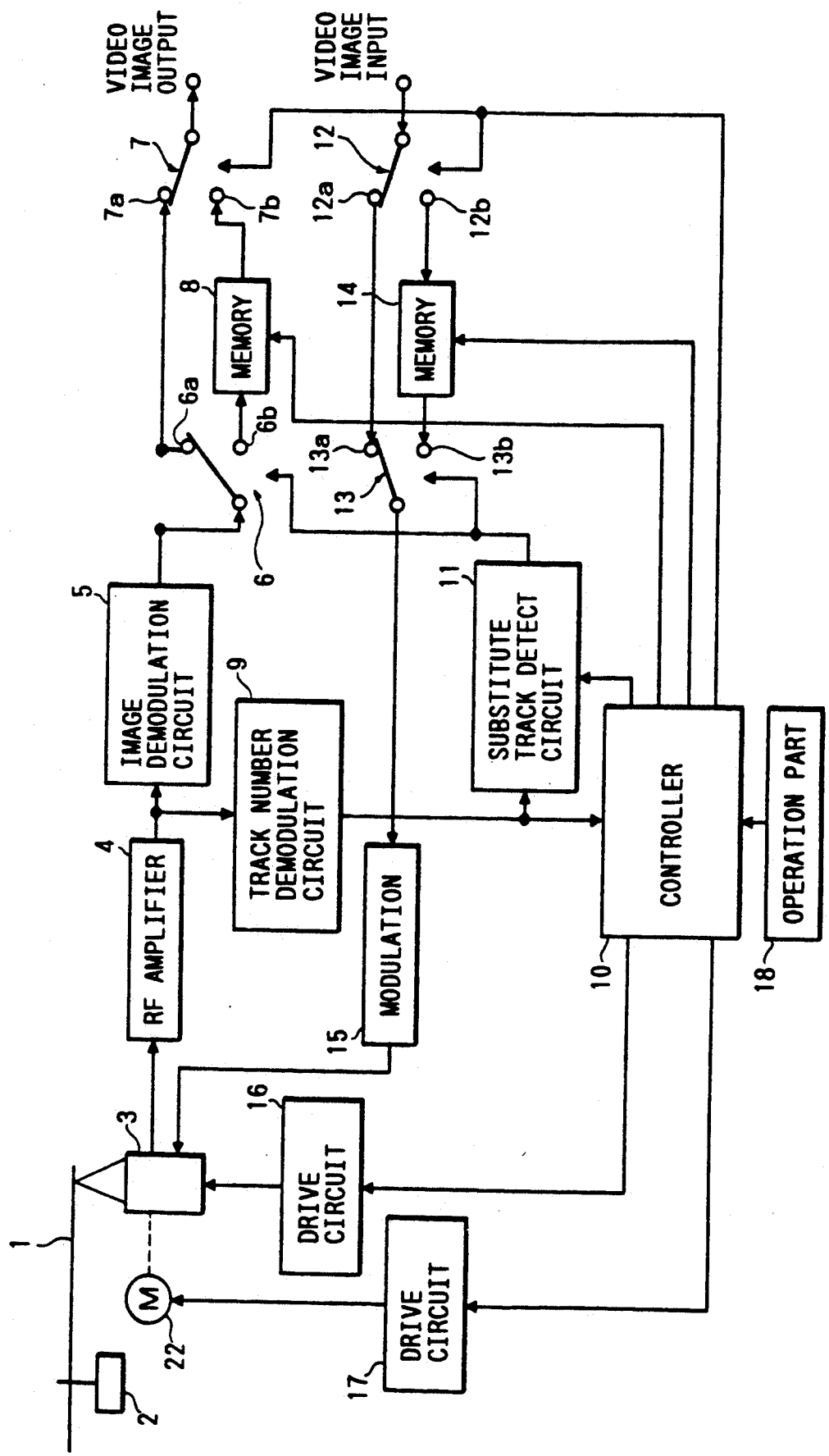
FIG. 1 is a block diagram of a device to which a video signal recording/reproducing method according to the invention is applied.

Referring to FIG. 1, there is shown a block diagram of a recording/reproducing device for an optical video disc which uses a video signal recording/reproducing method according to the present invention. In this device, a video disc 1 is rotationally driven by a spindle motor 2 and record information of the video disc 1 is written and read out by a pickup 3. The pickup 3 is disposed in such a manner that it can be moved linearly in the radial direction of the disc. Preferably, the pickup 3 is carried by a slider (not shown) which advantageously can be driven by a slider motor 22 constructed as a linear motor. The pickup 3 incorporates an optical system including a laser diode, an objective lens and similar components well known to those of ordinary skill in the art, a photoelectric detector for receiving a photo beam reflected by the video disc 1, a focus actuator for controlling the position of the objective lens in the optical axis direction thereof with respect to the information surface of the video disc 1, a tracking actuator for controlling the position of a main beam spot (information read point) generated from pickup 3 in the disc radial direction with respect to a recording track, and other elements. The output of the pickup 3 is sent to an RF amplifier 4 and is then demodulated by a demodulation circuit 5 to turn out a video signal.

The output of the demodulation circuit 5 is connected to change-over switches 6 and 7. The change-over switches 6, 7, together with change-over switches 12, 13, which are discussed in detail below, have first and second fixed terminals, respectively, one of which can be selected at a time. The change-over switch 6 relays and supplies to a memory 8 a video signal output from the demodulation circuit 5 when the second fixed terminal 6b of change-over switch 6 is selected. The change-over switch 7 relays to a video image output terminal a video signal output from the demodulation circuit 5 when the first fixed terminal 7a is selected, and relays to the video image output terminal a video signal read out from a memory 8 when the second fixed terminal 7b is selected.

The output of RF amplifier 4 is connected to a track number demodulation circuit 9, which is used to extract a track number signal indicating the current track position of a spot light from the pickup 3 from the RF signals of the RF amplifier 4. The track number demodulation circuit 9 advantageously can include a subcode signal demodulation circuit. Preferably, when the track number signal is included in the vertical blanking period of a video signal, a vertical blanking period extract circuit is also used. The output of the track number demodulation circuit 9 is connected to a controller 10 and a substitute track detect circuit 11. The controller 10 advantageously includes a microcomputer and is used to control a drive circuit 16, which is used to drive a tracking actuator incorporated in the pickup 3, and a drive circuit 17, which is used to drive slider motor 22 to move the pickup 3 in the disc radial direction. The controller 10 also controls the writing and read-out operations of memories 8 and 14. The substitute track detect circuit 11 generates a switch signal supplied to the change-over switches 6 and 13 when the track number signal supplied from the track number demodulation circuit 9 indicates that a substitute track is in the range of a substitute record area B, which area is discussed later. The substitute track detect circuit 11 is supplied with a signal from the controller 10 which indicates a track in the substitute record area B.

A video signal for recording is supplied from a video image input terminal to change-over switch 12. The change-over switch 12 relays an input video signal to the change-over switch 13 when the first fixed terminal 12a of the change-over switch 12 is selected, and relays the input video signal to the memory 14 when the second fixed terminal 12b is selected. The change-over switch 13 relays and supplies an input video signal from the change-over switch 12 to a modulation circuit 15 when the first fixed terminal 13a is selected, and relays and supplies a video signal read out from the memory 14 to the modulation circuit 15 when the second fixed terminal 13b is selected. The modulation circuit 15 modulates the frequency of a given carrier signal in accordance with the video signals supplied to thereby create a record signal. The record signal output from the modulation circuit 15 is supplied to the pickup 3. The change-over switches 6, 7, 12 and 13 are in their normal positions when the first fixed terminals are selected.

Figure 2:
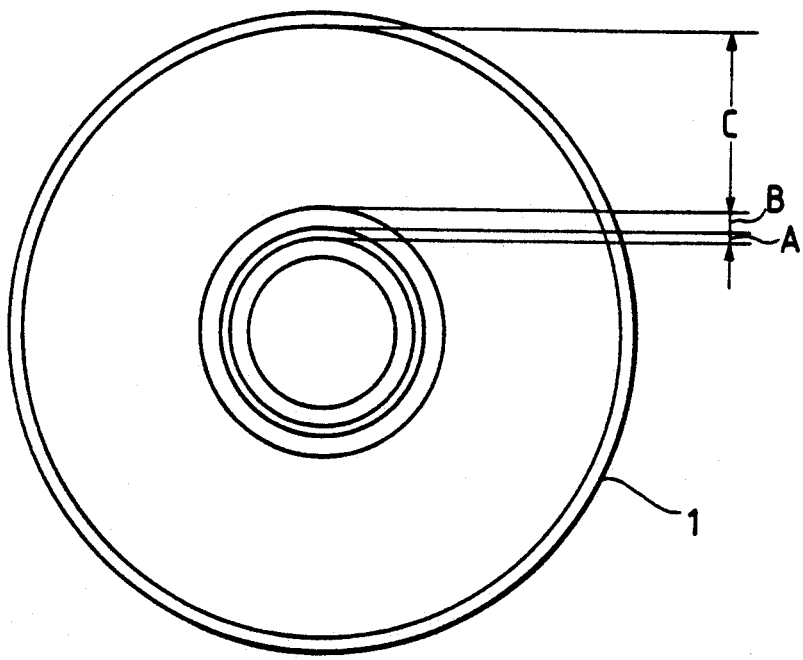
FIG. 2 is a view of the respective record areas of a video disc employed in the present invention.

The video disc 1 according to the invention and used in the present recording/reproducing device, as shown in FIG. 2, includes a disc information record area A in the inner-most peripheral portion of the video disc 1. Adjacent to the disc information record area A is a substitute record area B while the outer peripheral portion of the video disc 1 outside of the substitute record area B is a normal record area C. The track number is specified from the inner-most peripheral side toward the outer-most peripheral side. In an exemplary case, the track number is specified from No. 1 to No. 54,000. Preferably, the video disc 1 is constructed in such a manner that one frame of video signal is recorded on one track.

A description will now be given of a video signal recording/reproducing method according to the invention with respect to the operation of the controller 10.

Figure 3:
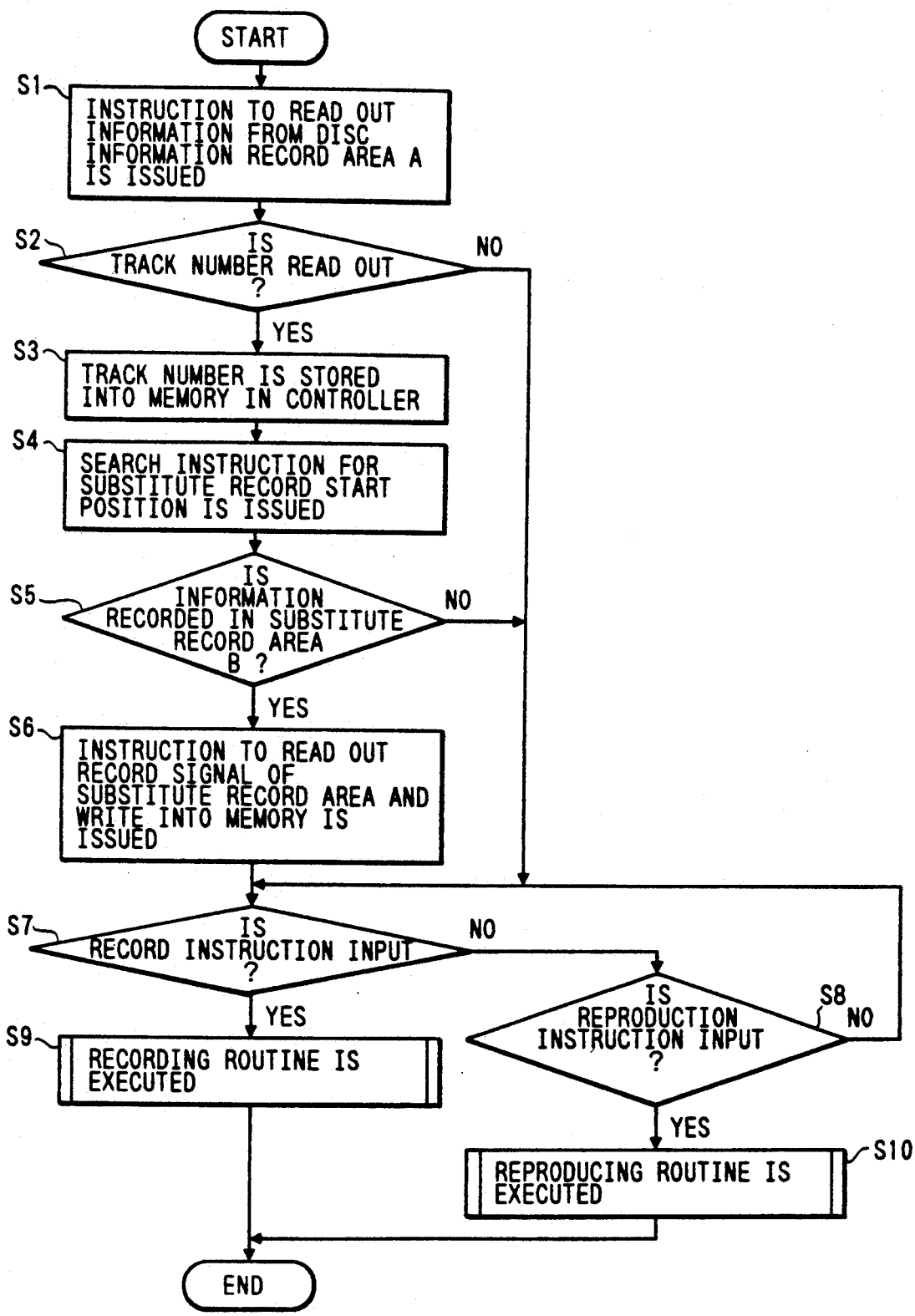
FIG. 3 is a flow chart of the operation of a controller employed in the device shown in FIG. 1.

Referring to FIG. 3, when the video disc 1 is mounted, the controller 10 issues an instruction to read out information from the disc information record area A during Step S1. It will be noted that during a defect check, which is carried out when the video discs are manufactured, an unrecordable defective track is detected and the detective track number is written in the disc information record area A. Accordingly, the drive circuits 16 and 17 are operated in response to the information read-out instruction to move the spot light position from pickup 3 to the read-out start position of the disc information record area A and, if any defective track number is recorded in the disc information record area A, then this record information is read out. The information read out from pickup 3 is supplied as an RF signal through the RF amplifier 4 to the track number demodulation circuit 9, and the RF signal is demodulated by the track number demodulation circuit 9 and is then supplied to the controller 10 as a track number signal. The controller 10, after execution of Step S1, checks whether the track number is read out from the disc information record area A or not during Step S2. If the track number is read out, then the read out track number is stored in a memory (not shown) contained within the controller 10 at Step S3.

Next, a search instruction for the substitute record start position is issued during Step S4. In response to the search instruction, the drive circuits 16 and 17 are operated so that the spot light position of the pickup 3 is moved to the start position of the substitute record area B. Preferably, when the spot light position is moved to the substitute record area B, the track number signal demodulated from the signal supplied to the track number demodulation circuit 9 is turned into a signal which indicates a substitute track, with the result that the substitute track detect circuit 11 generates a switch signal to the change-over switches 6 and 13. Based on this switch signal, the change-over switch 6 is operated to select the second fixed terminal 6b. Preferably, the controller 10 checks whether information is recorded in the substitute record area B or not at Step S5. If the information is recorded in the substitute record area B, then a read-out instruction is issued at Step S6, thereby providing a normal trace condition. As a result of this operation, the RF signal read out from pickup 3 is supplied through the RF amplifier 4 to the video image demodulation circuit 5 where it is demodulated into a video signal, and the video signal is supplied through the changeover switch 6 to the memory 8. Thus, a video signal corresponding to the information recorded in the substitute record area B is written into the memory 8.

The controller 10 then checks to determine whether a record instruction has been input by a key operation from an operation part 18 or not during Step S7. If the record instruction has not been input, then a determinations is made as to whether a reproduction instruction has been input by a key operation from the operation part 18 or not during Step S8. If the record instruction has been input, then a recording routine is executed at Step S9. If the reproduction instruction has been input, then a reproducing routine is executed during Step S10.

Figure 4:
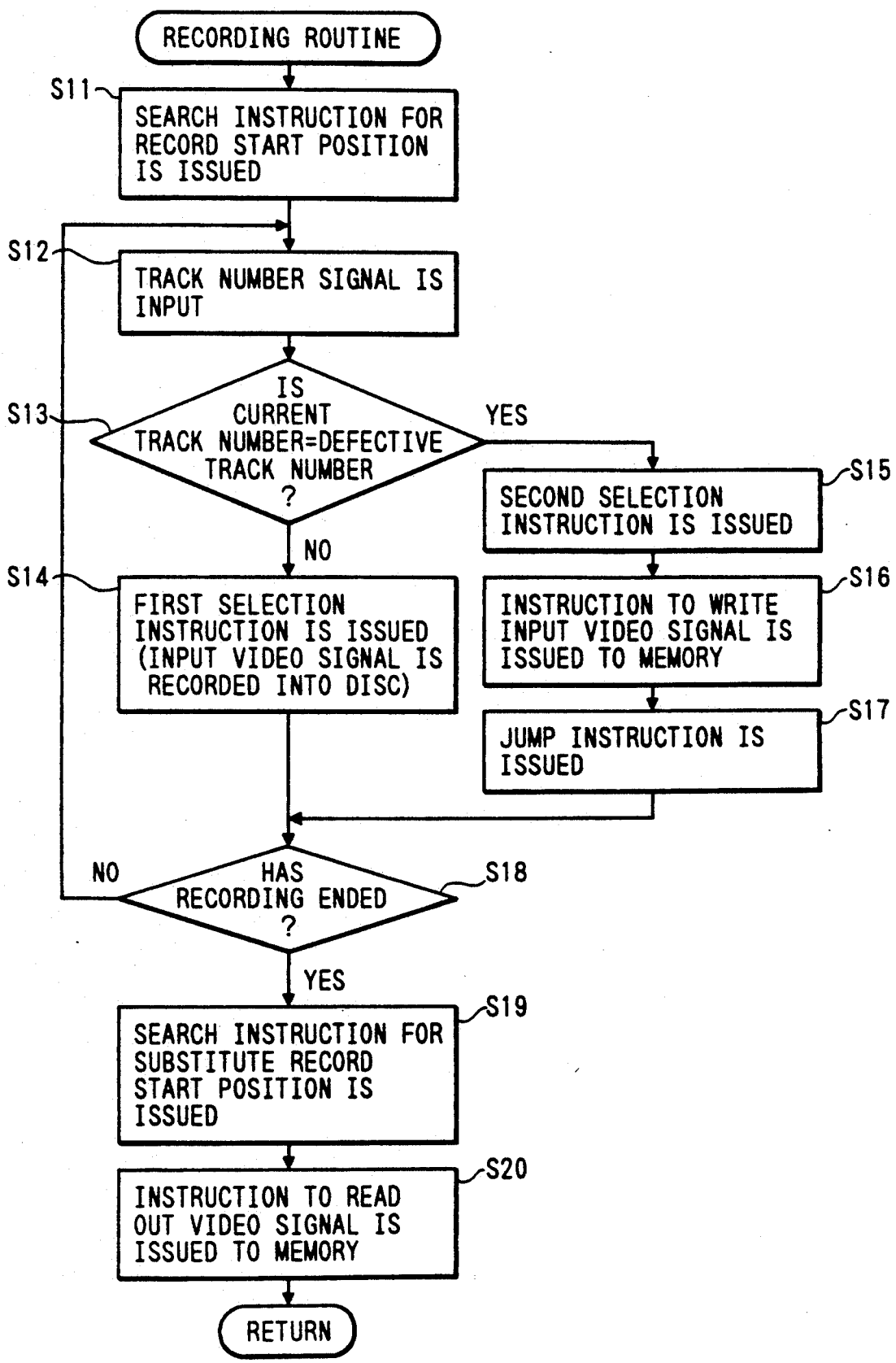
FIG. 4 is a flow chart of a recording routine included in the flow chart of FIG. 3.

During the recording routine, as shown in FIG. 4, a search instruction for movement to the record start position is issued during Step S11. Based on this search instruction, the drive circuits 16 and 17 are operated to move the spot light position of the pickup 3 to the start position of the normal record area C and, after the movement of the spot light position, the status of the recording routine is moved to the normal trace status. In other words, the drive circuits 16 and 17, as well as a tracking servo system and a focus servo system, are operated such that the spot light position from pickup 3 is able to trace the normal record area C. Preferably, in synchronism with the starting of the recording routine, a video signal to be recorded, which is produced by a video source (not shown), is input.

After execution of Step S11, a track number signal demodulated by the track number demodulation circuit 9 is input from the RF signals that are read and obtained from pickup 3 during recording, i.e., at Step S12. A check is then made during Step S13 to determine whether the current track number indicated by the track number signal input is or is not equal to a defective track number stored in the memory within the controller. If the current track number is not equal to the defective track number, then a first selection instruction is issued during Step S14. The change-over switch 12 selects the first fixed terminal 12a according to the first selection instruction and the video signal is supplied through the change-over switches 12, 13 to the modulation circuit 12, so that a record signal corresponding to the video signal is supplied from the modulation circuit 12 to the pickup 3. As a result of this operation, the record signal is recorded into a track existing at the current recording position of the video disc 1.

On the other hand, if the current track number is equal to the defective track number, then a second selection instruction is issued at Step S15, a writing instruction is issued to the memory 14 during Step S16, and a jump instruction is issued to the drive circuit 17 during Step S17. Based on the second selection instruction, the change-over switch 12 selects the second fixed terminal 12b, and the video signal is supplied from the video image input terminal through the change-over switch 12 to the memory 14 and is written into the memory. The drive circuit 17, in response to the jump instruction, drives the tracking actuator to cause the spot light position from pickup 3 to move or jump the defective track to a track existing after the defective track. As a result of this operation, the defective track portion is jumped and a video signal during a time necessary for this jump is written into the memory 14 but not into the video disc.

The controller 10, after executing one of Steps S14 and S17, checks whether recording has ended or not at Step S18. For example, when the video signals are being continuously supplied to the video image input terminal, the recording has not ended and the recording routine goes back to Step S12 and repeats the above-mentioned operations. When the supply of the video signals to the video image input terminal has stopped, it is assumed that recording has ended and a search instruction for movement to the substitute record start position is issued during Step S19 and a read-out instruction to the memory 14 is issued during Step S20.

Based on the search instruction, the drive circuits 16 and 17 are operated to move the spot light position from pickup 3 to the start position of the substitute record area B and, after completion of the movement of the spot light position, the recording routine goes back to the normal trace status. Preferably, after the spot light position is moved to the substitute record area B, then the track number signal, which is read out from the read-out RF signals and is demodulated by the track number demodulation circuit 9, provides a signal which indicates a substitute track, so that the substitute track detect circuit 11 issues a switch signal to the change-over switches 6 and 13. Based on this switch signal, the change-over switch 13 is operated to select the second fixed terminal 13b. As a result of this operation, the video signal is read out from the memory 14 and is supplied to the modulation circuit 15 and a record signal corresponding to the video signal from the memory 14 is recorded into the substitute record area B.

Figure 5:
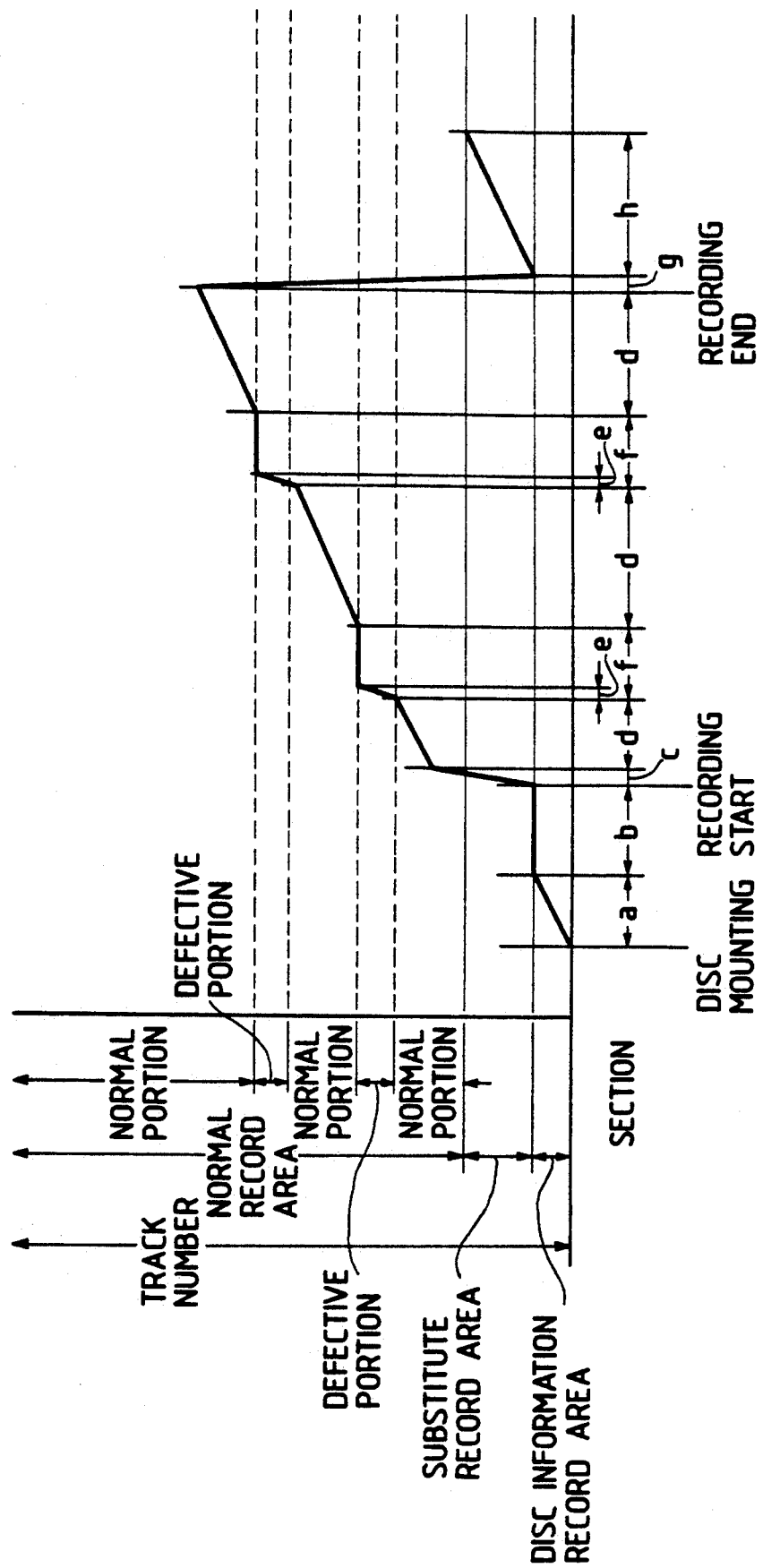
FIG. 5 is a timing chart illustrating the recording routine.

Referring now to FIG. 5, there is shown a timing chart for the recording routine. In this timing chart, section a designates an operation to read out the defective track number from the disc information record area A, section b illustrates a wait state after completion of the operation of the section a, section c represents a search operation to move the spot light position from the disc information record area A to the start position of the normal record area C, section d represents a recording operation for writing into the normal record area C, section e denotes a defective track jumping operation, section f designates an operation to write a video signal corresponding to the defective track into the memory 14, section g illustrates a search operation to move the spot light position from the normal record area C to the start position of the substitute record area B, and section h corresponds to an operation for writing a record signal, which corresponds to the video signal stored in the memory 14, into the substitute record area B.

Figure 6:
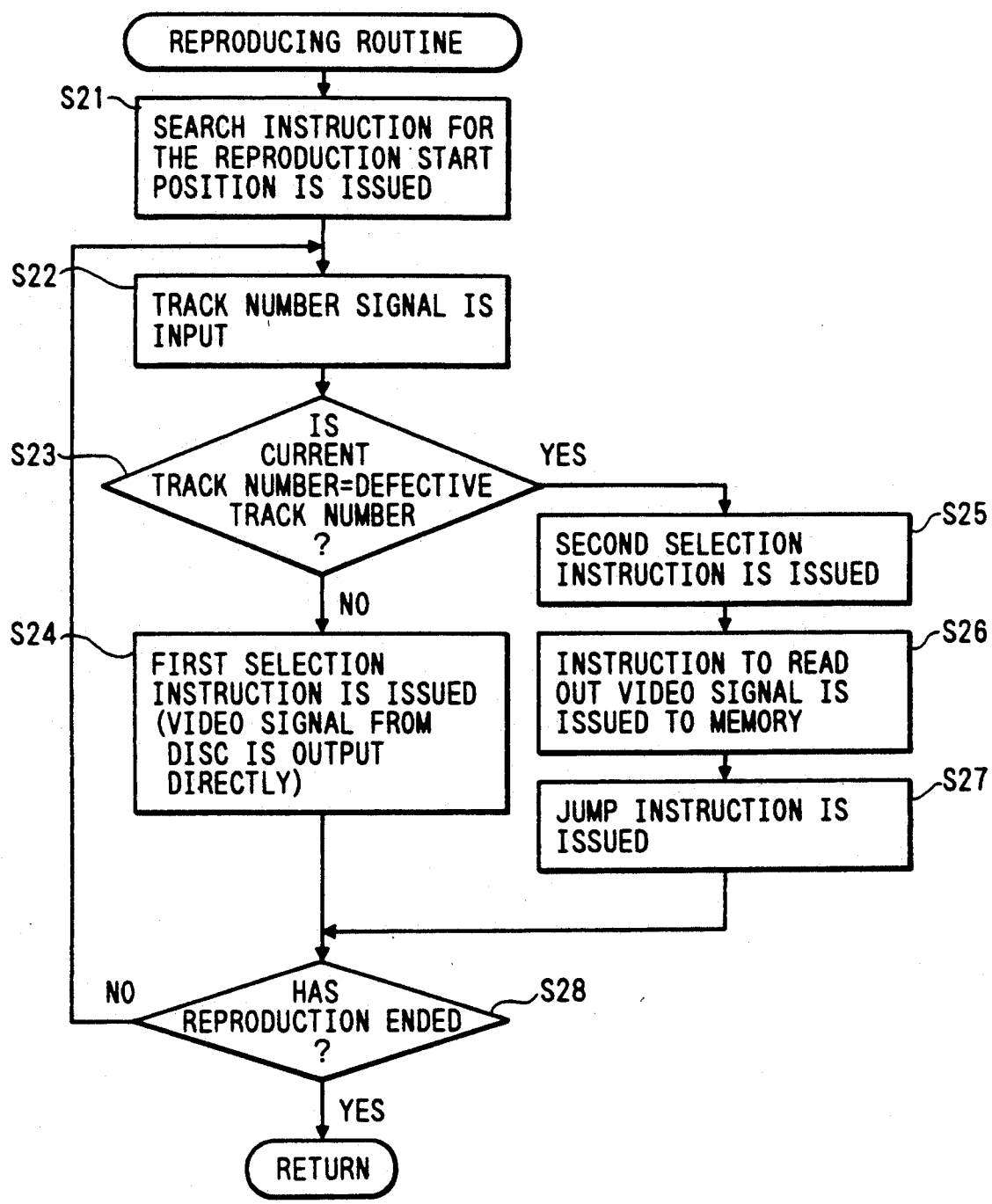
FIG. 6 is a flow chart of a reproducing routine included in the flow chart of FIG. 3.

In the reproducing routine, as shown in FIG. 6, a search instruction for the reproduction start position is issued at Step S21. In response to this search instruction, the drive circuits 16 and 17 are operated to move the spot light position from pickup 3 to the start position of the normal record area C. After movement to the start position of the normal record area C, the reproducing routine goes to the normal trace status. After execution of Step S21, a track number signal, which is demodulated by the track number demodulation circuit 9 from the RF signals read out, is input during Step S22. During Step S23, a check is performed to determine whether or not a current track number represented by the input track number signal is equal to the defective track number stored in the memory in the controller 10. If the track number is not equal to the defective track number, then a first selection instruction is issued at Step S24, whereby the change-over switch 7 selects the first fixed terminal 7a. As a result of this operation, the RF signal read out by the pickup 3 is supplied through the RF amplifier 4 to the demodulation circuit 5 in which it is demodulated to a video signal, and the video signal is output through the change-over switch 8 from the video image output terminal.

When the current track number is equal to the defective track number, then a second selection instruction is issued during Step S25, an instruction to read out information from the memory 8 is issued during Step S26, and a jump instruction is issued to the drive circuit 17 at Step S27. In response to the second selection instruction, the change-over switch 7 selects the second fixed terminal 7b and the video signal read out from memory 8 is output through the change-over switch 7 to the video image output terminal. Preferably, in response to the jump instruction, the drive circuit 17 drives the tracking actuator, thereby causing the spot light position from pickup 3 to jump the defective track and move to a track following the defective track. The controller 10, after execution of one of Step S24 and S27, performs a check to determine whether or not the reproduction has ended at Step S28. If reproduction has not ended, then the reproduction routine goes back to Step S22. However, if reproduction has ended, the reproduction routine is terminated.

Figure 7:
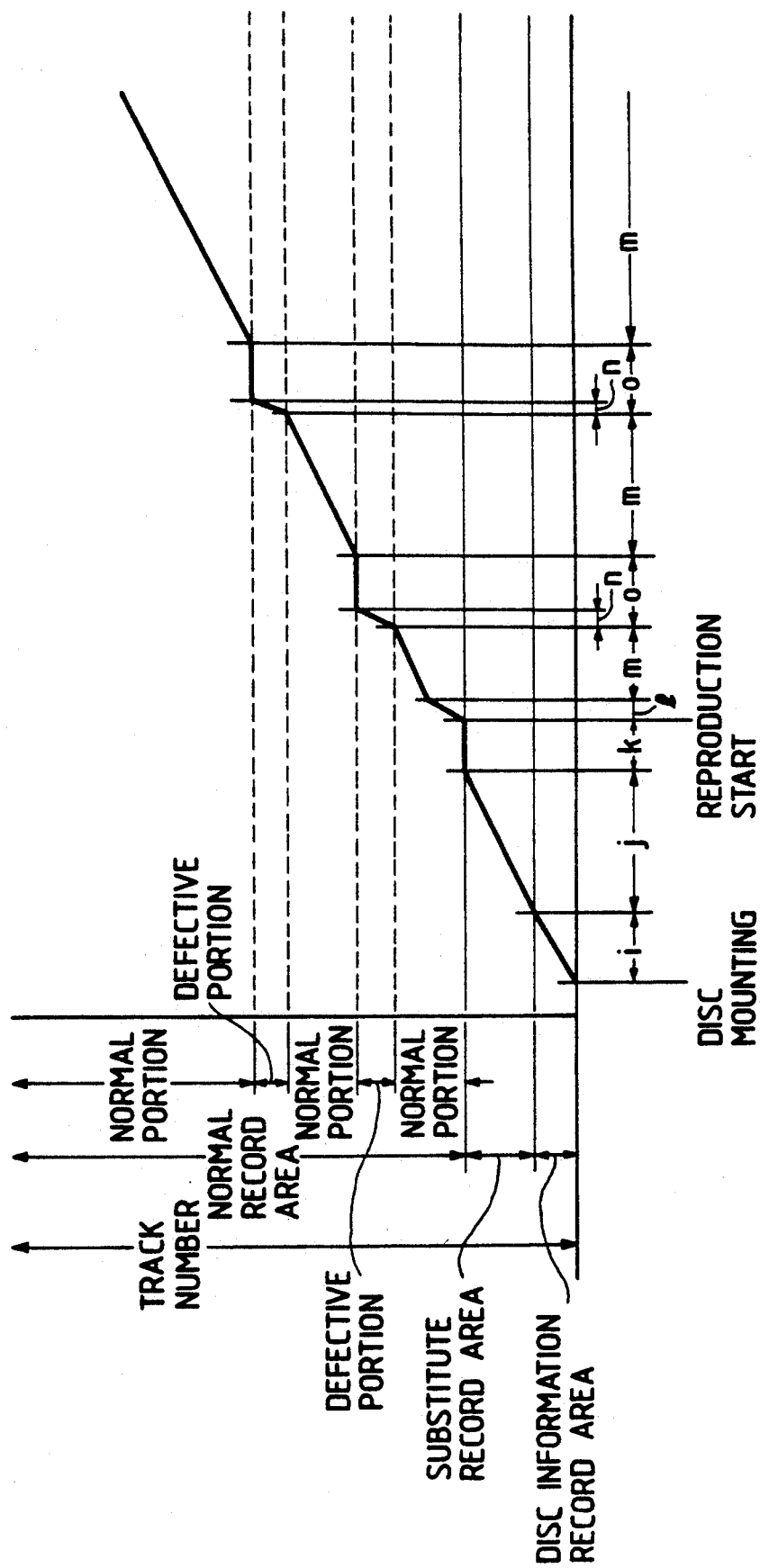
FIG. 7 is a timing chart illustrating the reproducing routine.

Referring now to FIG. 7, there is shown a timing chart illustrating the reproducing routine. In this timing chart, section i designates an operation to read out the defective track number from the disc information record area A, section j illustrates an operation to read out the record signal of the substitute record area B and write a video signal corresponding to the record signal into the memory 8, section k denotes a wait state after completion of the operation of the section j, section l represents a search operation for the start position of the normal record area C, section m expresses a reproduction operation by means of read-out from the normal record area C, section n illustrates a jump operation for the defective track and section o represents a reproduction operation to be performed by reading out a video signal corresponding to the defective track from the memory 8.

Figure 8:
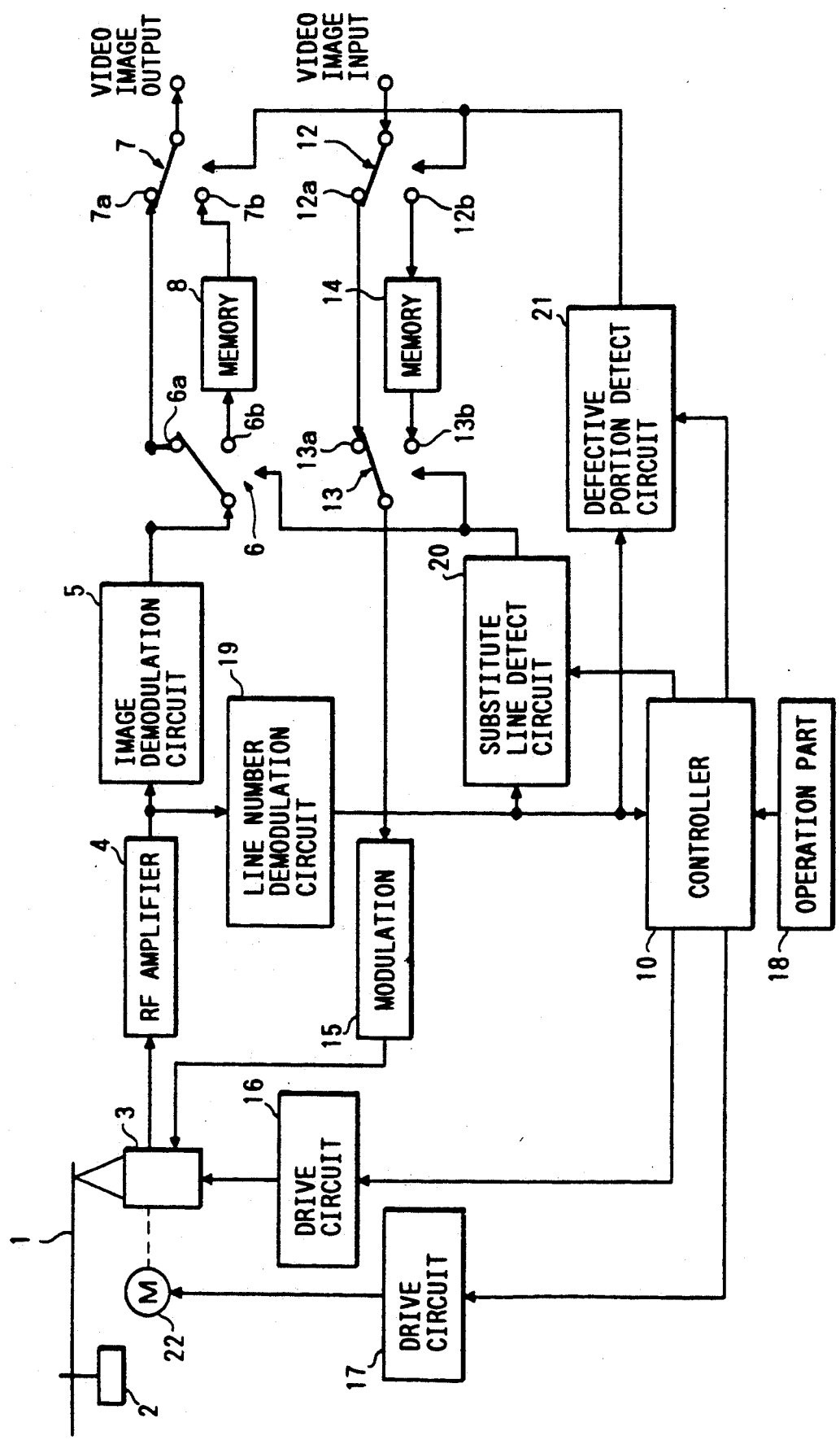
FIG. 8 is a block diagram of a device to which another embodiment of a video signal recording/reproducing method according to the invention is applied.

Referring to FIG. 8, a block diagram of another embodiment according to the invention, which illustrates a recording/reproducing device for an optical video disc, is shown. In the above-mentioned embodiment, with respect to the defective portion, the defective portion information is expressed as a track unit and thus the video signal is written in a one frame unit into the memories 8 and 14 in place of the defective portion information. On the other hand, in another embodiment, with respect to the defective portion, the defective portion information is expressed as an address in horizontal period length (line) units and thus a video signal is written in a horizontal period unit into the memories 8 and 14 in place of the defective portion information.

In the recording/reproducing device shown in FIG. 8, the same parts as those shown in FIG. 1 are given the same designations. In this embodiment, however, a line number demodulation circuit 19 is connected to the output of the RF amplifier 4. The line number demodulation circuit 19 extracts a line number signal from the RF signals, which indicates the current line position of the spot light from pickup 3. The line number signal from the line number demodulation circuit 19 is supplied to the controller 10, a substitute line detect circuit 20 and a defective portion detect circuit 21. The substitute line detect circuit 20 issues a switch signal to the change-over switches 6 and 13 when the line number signal is a signal which indicates a substitute line within the substitute record area B. The substitute line detect circuit 20 is supplied from the controller 10 with a signal which indicates a line within the substitute record area B. The defective portion detect circuit 21 is supplied from the controller 10 with defective line address information, which is stored in an internal memory. The defective portion detect circuit 21 detects the defective line in accordance with line number signal and defective line address information. The defective portion detect circuit 21 generates a first selection instruction when the defective line is not detected, and generates a second selection instruction when the defective line is detected. These selection instructions are supplied to the change-over switches 7 and 12. The remaining structures of this embodiment are the same as those shown in FIG. 1.

A description will now be provided of this embodiment of a recording/reproducing method according to the invention with reference to the operation of the controller 10.

Figure 9:
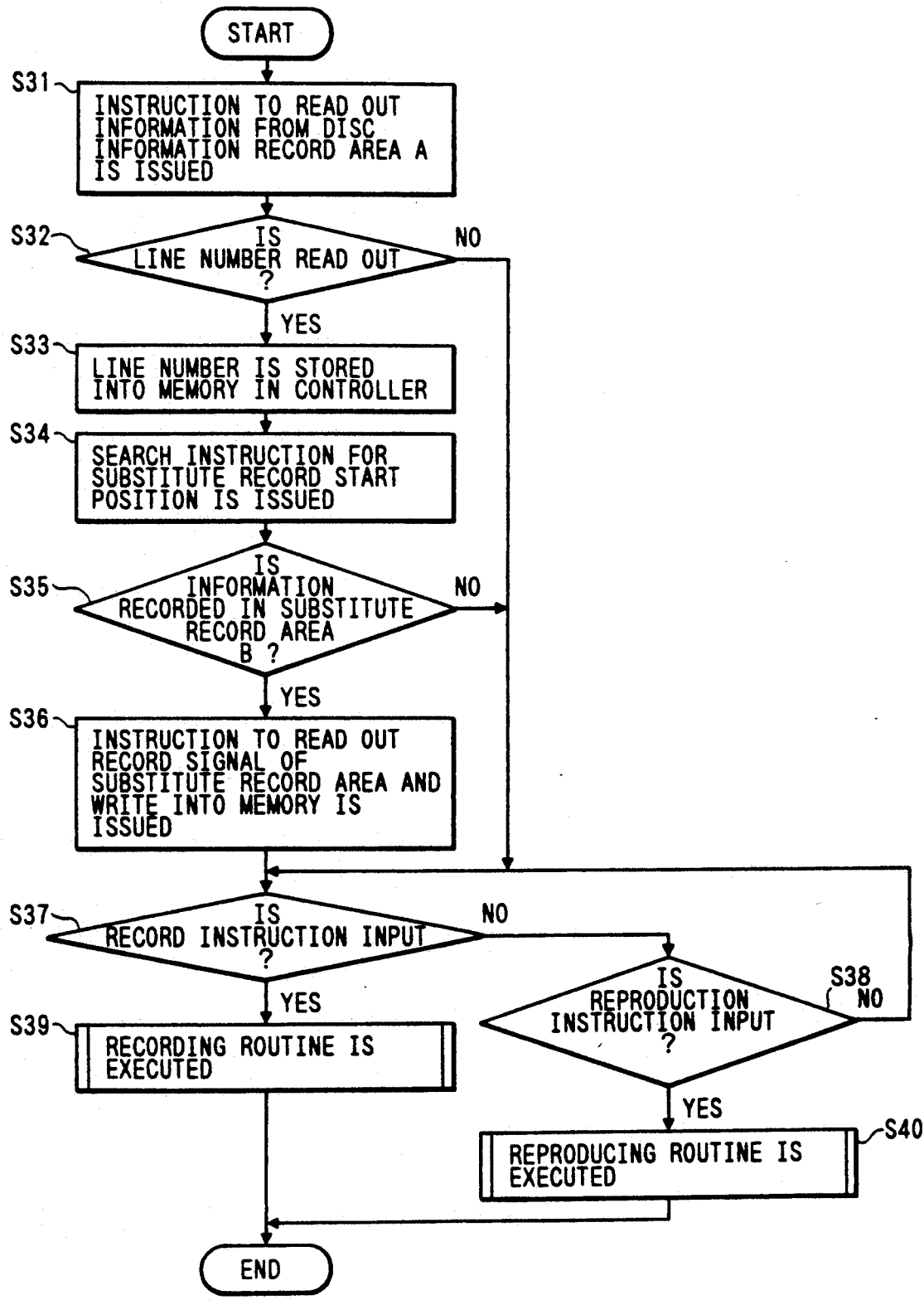
FIG. 9 is a flow chart of the operation of a controller employed in the device shown in FIG. 8.

When the video disc 1 is mounted, the controller 10, as shown in FIG. 9, issues an instruction to read out information from the disc information record area A during Step S31. An unrecordable defective line is detected by a defect check carried out when the discs are manufactured and the number (address) of the defective line is written into the disc information record area A. Based on the information read-out instruction, the drive circuits 16 and 17 are operated to move the spot light position from pickup 3 to the read-out start position of the disc information area A. If the defective line number is recorded in the disc information record area A, then the corresponding record information is read out. The information that is read out from pickup 3 is supplied as an RF signal through the RF amplifier 4 to the line number demodulation circuit 19, is demodulated by the line number demodulation circuit 19, and is supplied as a line number signal to the controller 10. The controller 10, after execution of Step S31, determines whether or not the line number has been read out from the disc information record area A during Step S32. If the line number has been read out, then the read-out line number is stored in a memory (not shown) within the controller 10 at Step S33.

Next, the controller 10 issues a search instruction for the substitute record start position during Step S34, and determines whether or not information is recorded in the substitute record area B during Step S35. The operations performed in Steps S34 and S35 are similar to those in Steps S4 and S5, discussed above. If information has been recorded in the substitute record area B, then the controller 10 issues a read-out instruction at Step S36, and sets up the normal trace state. As a result of this operation, the RF signal readout from pickup 3 is supplied through the RF amplifier 4 to the video image demodulation circuit 5 and is demodulated into a video signal, and the video signal is supplied through the change-over switch 6 to the memory 8. Thus, a video signal corresponding to the signal information recorded in the substitute record area B is written into the memory 8. The controller 10 then executes Steps S37–S40. These steps are similar to the above-described steps S7–S10 and these steps will not be described further.

Figure 10:
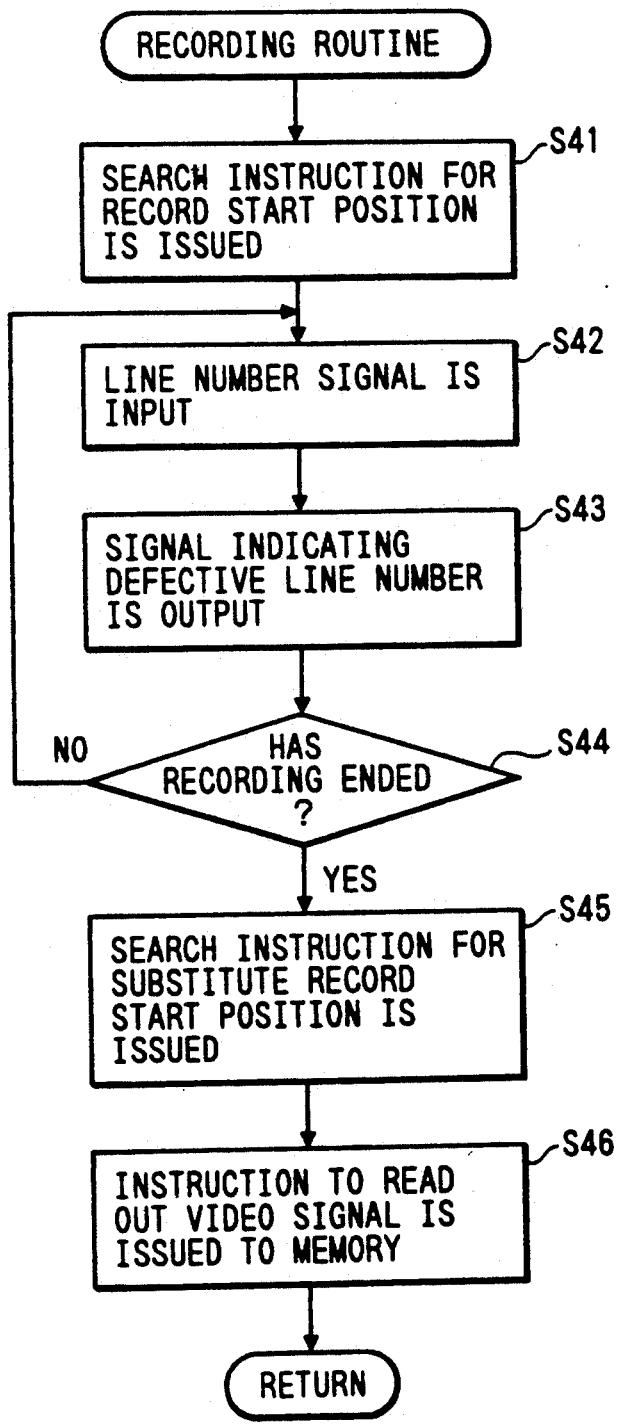
FIG. 10 is a flow chart of a recording routine included in the flow chart of FIG. 9.

During the recording routine, as shown in FIG. 10, the controller 10 issues a search instruction for the record start position at Step S41. Based on this search instruction, the drive circuits 16 and 17 are operated so that the spot light position from pickup 3 is moved to the start position of the normal record area C and, after such movement to the normal record area C start position, the recording routine goes to the normal trace state. In other words, the drive circuits 16 and 17, as well as a tracking servo system and a focus servo system, are operated in such a manner that the spot light position from pickup 3 can trace the track of the normal record area C. Preferably, in synchronism with the starting of execution of the recording routine, a video signal to be recorded from outside is input. After execution of Step S41, out of the RF signals which can be read out from pickup 3 during recording, a line number signal demodulated by the line number demodulation circuit 19 is input during Step S42. In accordance with the line number signal, the defective line numbers stored in the memories within the controller 10 are output sequentially to the defective portion detect circuit 21 during Step S43.

The defective portion detect circuit 21 is used to determine whether or not the current line number indicated by the line number signal supplied is equal to the defective line number. If the current track number is not equal to the defective line number, then a first selection instruction is issued to permit the change-over switch 12 to select the first fixed terminal 12a and allow the video signal to be supplied from the video image input terminal through the change-over switch 12 and then through the change-over switch 13 to the modulation circuit 12, which modulation circuit 12 supplies a record signal corresponding to the video signal to the pickup 3. As a result of this operation, the record signal is recorded in the line at the current record position of the video disc 1.

When the current track number is equal to the defective track number, then a second selection instruction is issued and a writing instruction is issued to the memory 14. In response to the second selection instruction, the change-over switch 12 selects the second fixed terminal 12b and the video signal is supplied from the video input terminal through the change-over switch 12 to the memory 14, which video signal is then written into the memory 14. The controller 10, after execution of Step S43, determines whether or not the recording has ended at Step S44. If the recording has not ended, then the recording routine goes back to Step S42 and the above-mentioned operations are repeated. On the other hand, if the recording has ended, then the controller 10 issues a search instruction for the substitute record start position during Step S45 and also issues a read-out instruction to the memory 14 during Step S46. Based on the search instruction, the drive circuits 16 and 17 are operated so that the spot light position from pickup 3 is moved to the start position of the substitute record area B and, after such movement, the recording routine goes back to the normal trace state. Preferably, when the spot light position is moved to the substitute record area B, then the line number signal demodulated by the line number demodulation circuit 19 out of the read-out RF signals provides a signal to indicate a substitute line and, therefore, the substitute line detect circuit 20 issues a switch signal to the change-over switches 6 and 13. Then, in response to the switch signal, the change-over switch 13 is operated to select the second fixed terminal 13b. As a result of this operation, a video signal is read out from the memory 14 and is supplied to the modulation circuit 15 so that a record signal corresponding to the video signal from the memory 14 can be recorded into the substitute record area B.

Figure 11:
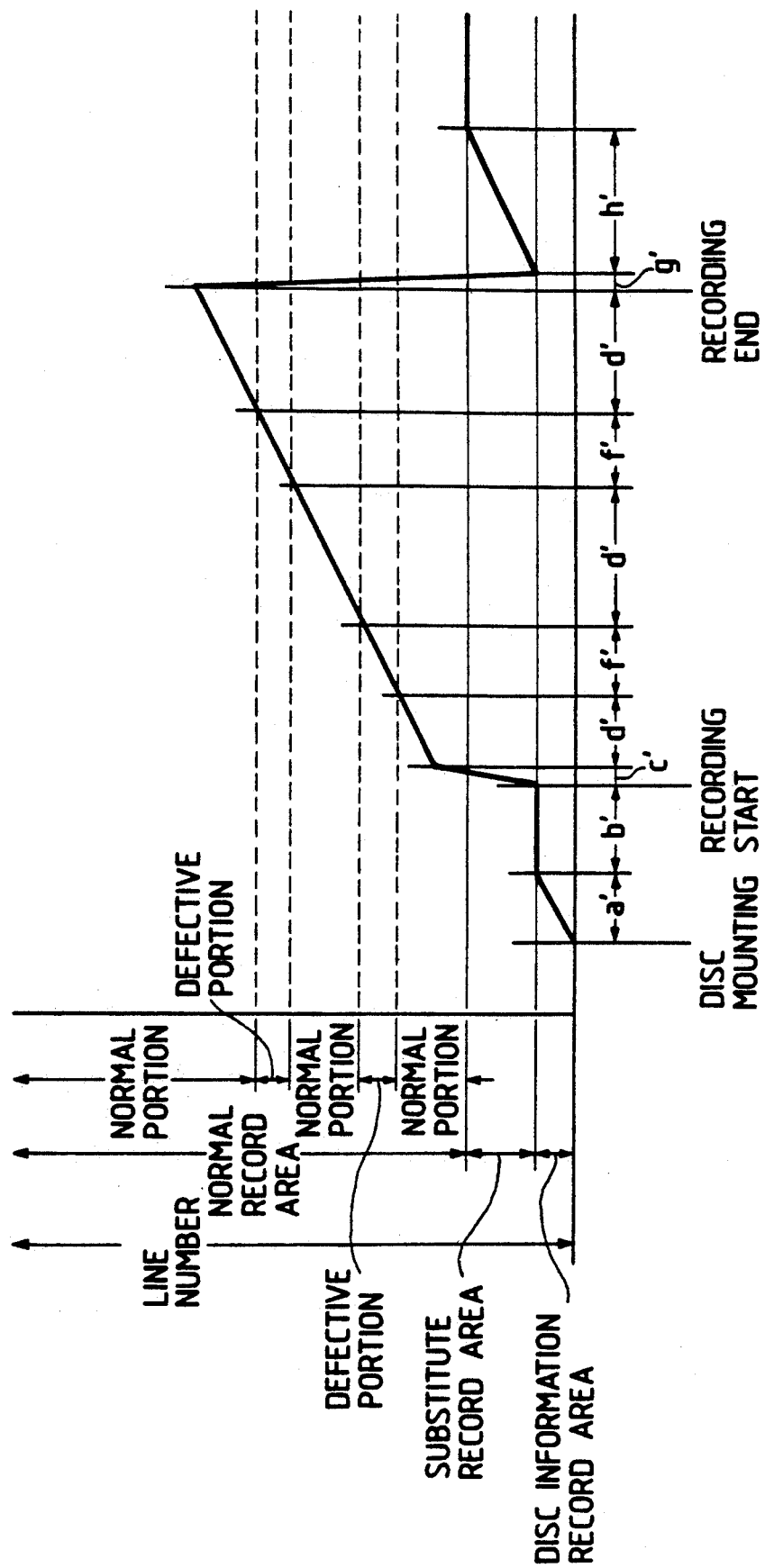
FIG. 11 is a timing chart illustrating the recording routine.

In FIG. 11, there is shown a timing chart for the above-described recording routine. In this timing chart, section a' illustrates an operation to read out the defective line number from the disc information record area A, section b' designates a wait state after completion of the operation of the section a', section c' represents a search operation to move the spot light position from the disc information record area A to the normal record area C, section d' represents a record operation to be performed by writing into the normal record area C, section f' expresses a write operation to write a video signal corresponding to a defective line into the memory 14, section g' represents a search operation to move the spot light position from the normal record area C to the substitute record area B, and section h' represents a write operation to write a record signal corresponding to a video signal stored in the memory to the substitute record area B.

Figure 12:
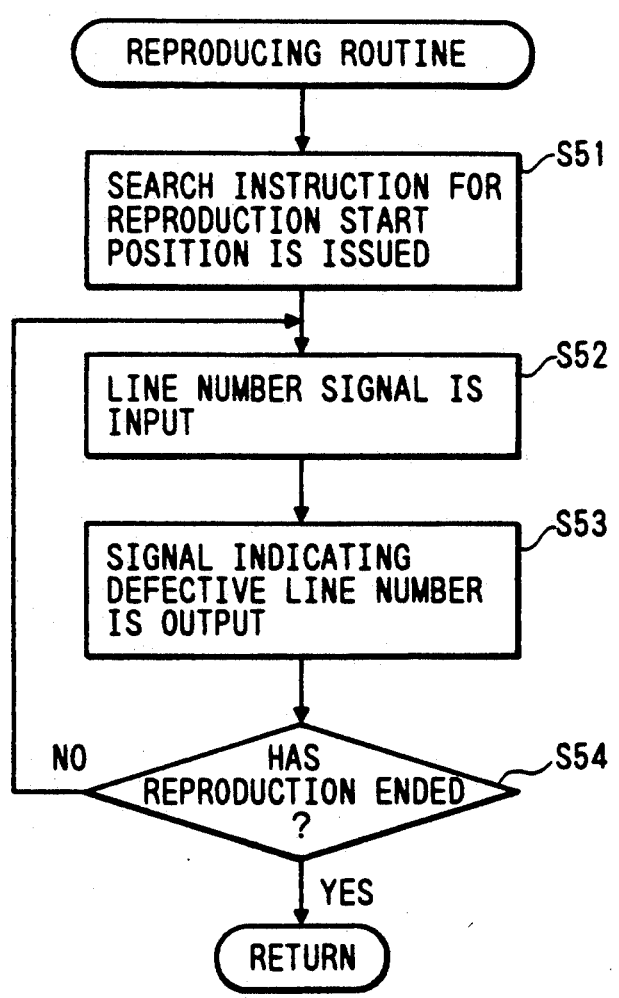
FIG. 12 is a flow chart of a reproducing routine included in the flow chart shown in FIG. 9.

In the reproduction routine, as shown in FIG. 12, the controller 10 issues a search instruction for the reproduction start position at Step S51. After execution of Step S51, the controller 10 reads a line number signal, which is demodulated by the line number demodulation circuit 19, from the RF signals read out, during Step S52. Signals respectively indicating the defective line numbers stored in the memories within the controller 10 are output sequentially to the defective portion detect circuit 21 in accordance with the line number signals read in during Step S53. The defective portion detect circuit 21 is used to determine whether or not the current line number indicating the line number signal supplied thereto is equal to the defective line number. When the current line number is not equal to the defective line number, then a first selection instruction is issued. Based on the first selection instruction, the change-over switch 7 selects the first fixed terminal 7a. Then, the RF signal read out from pickup 3 is supplied through the RF amplifier 4 to the demodulation circuit 5 in which the RF signal is demodulated into a video signal, and the video signal is then output through the change-over switch 8 from the video output terminal. On the other hand, if the current line number is equal to the defective line number, then a second selection instruction is issued and a memory 8 read-out instruction is issued. In response to the second selection instruction, the change-over switch 7 selects the second fixed terminal 7b and the video signal read out from the memory 8 is output through the change-over switch 7 from the video image output terminal. The controller 10, after execution of Step S53, checks whether the reproduction has ended or not during Step S54. If the reproduction routine has not ended, then the reproduction routine goes back to Step S52. On the other hand, if the reproduction routine has ended, then the reproduction routine is terminated.

Figure 13:
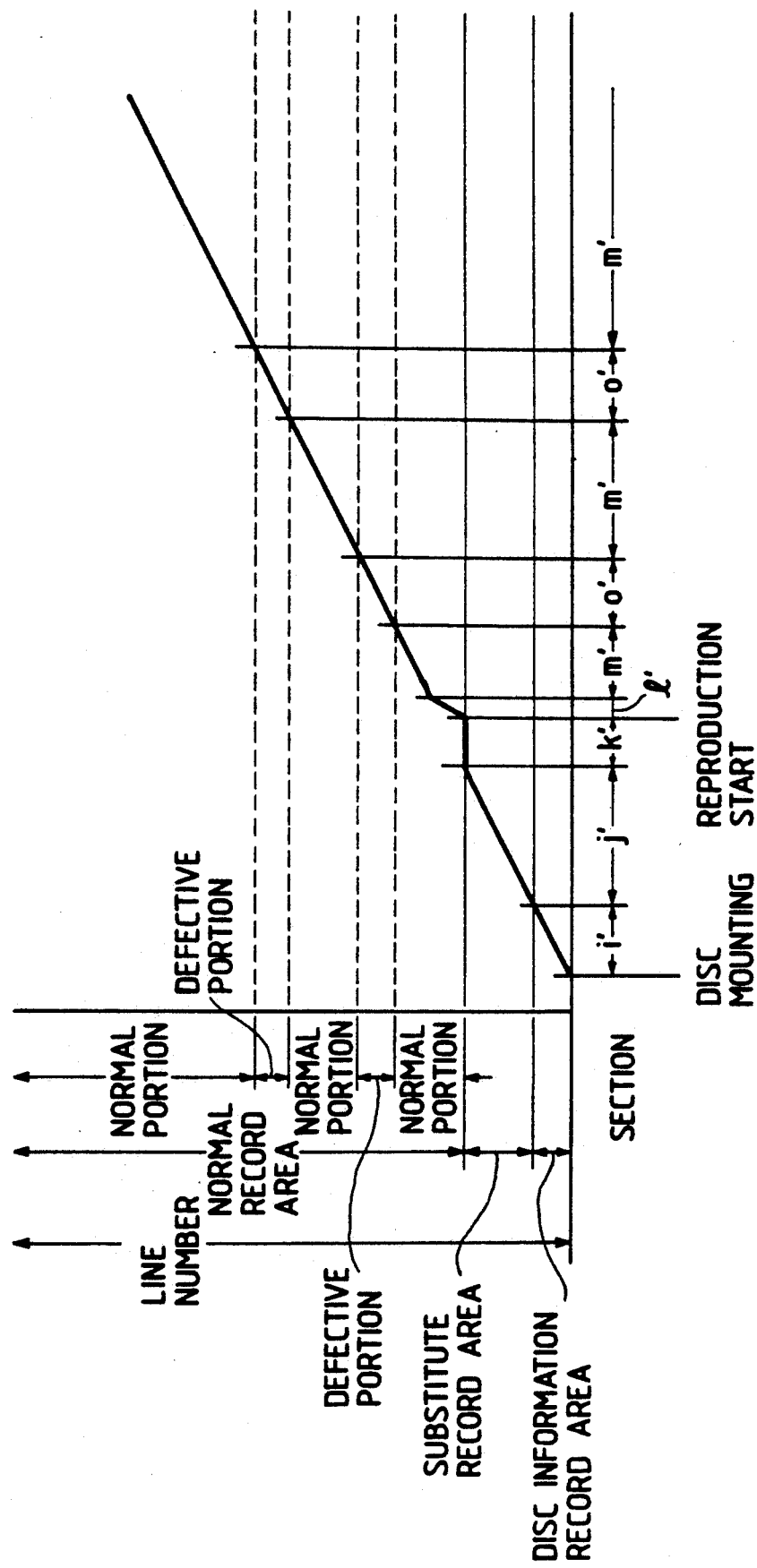
FIG. 13 is a timing chart illustrating the reproducing routine.

In FIG. 13, there is shown a timing chart of this latter reproduction routine. In this timing chart, section i' illustrates a read-out operation to read out the defective line number from the disc information record area A, section j' represents an operation to read out the record signal of the substitute record area B and write into the memory 8 a video signal corresponding to the read-out record signal, section k' designates a wait state after completion of the operation of the section j', section l' indicates a search operation to move the spot light position to the start position of the normal record area C, section m' represents a reproduction operation to be performed by means of read-out from the normal record area C, and section o' expresses a reproduction operation to be performed by reading out from the memory 8 a video signal corresponding to the defective line.

In the above-mentioned respective embodiments, description has been given of a case in which a video disc is used as a recording medium. However, this is not limitative, but it is clear that a magnetic disc or a magnetic tape can also be used as the recording medium.

According to the invention, due to the fact that the recording medium includes a normal record area for recording a video signal, a recording medium information record area in which information with respect to the defective portion of the recording medium has been previously recorded, and a substitute record area for recording a video signal to be recorded into the defective portion of the recording medium, if the recording medium has an unrecordable defective portion, the video signal to be recorded into the defective portion can be recorded into the substitute record area and, by reproducing the video signal recorded in the substitute record area prior to reproduction of the video signal from the normal record area. By storing the thus reproduced video signal, if a video signal is read out from the memory during reproduction in accordance with the information with respect to the defective portion of the recording medium previously recorded in the record medium information record area, then successive or continuous images can be obtained.

According to the invention, prior to the recording and reproducing of a video signal, defective portion information is read out from a record medium information record area and is stored. During the recording routine, the video signal is written into a normal record area in recording until the writing position reaches a position corresponding to the defective portion information, at which time a video signal of a predetermined unit to be written to this position is written into a memory. After completion of recording of the video signal into the normal record area, the video signal is read out from the memory and is written into a substitute record area. Thus, even if the recording medium has a defective portion, a video signal corresponding to the defective portion can be recorded into the recording medium. Preferably, due to the fact that during reproduction a video signal is first reproduced from the substitute record area and is written into the memory, after which a video signal from the normal record area is read out and is output as a reproduction signal, when the read-out position reaches a position corresponding to the defective portion information, the video signal can be read out from the memory and output as a reproduction signal. Thus, the video signal portions corresponding to the defective portion can be read out from the recording medium as continuous video signals. Therefore, when the recording medium such as a disc has a defective portion into which a video signal cannot be recorded, continuous images can be obtained during reproduction even if the record information is a video signal.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of reproducing a video signal from a recording medium having a normal record area for storing a video signal recorded therein, a recording medium information record area for storing information identifying defective portions of the recording medium, and a substitution record area for storing a video signal intended to be recorded in at least one defective portion of the recording medium, said method comprising the steps of:

reading out said defective portion information from said recording medium information record area and storing said defective portion information in a first memory external to said medium before said video signal is reproduced;

reproducing said video signal from said substitution record area and writing the video signal thus read into a second memory;

after said reproducing step, reading out said video signal from positions of said normal record area and outputting the video signal thus read as a reproduction signal; and when said read-out position corresponds to a position identified by said defective portion information, reading out said video signal from said second memory and outputting said video signal from said second memory as said reproduction signal.

2. A method of recording and reproducing a video signal on and from a recording medium having a normal record area for recording a video signal, a recording medium information record area for storing information identifying defective portions of the recording medium, and a substitution record area for recording a video signal intended to be recorded in at least one defective portion of the recording medium, said method comprising the steps of:

reading out said defective portion information from said recording medium information record area and storing said defective portion information in a first memory external to said medium before said video signal is recorded or reproduced;

recording a the video signal into positions on said normal record area;

when said writing position reaches a position of said normal record area which corresponds to a position identified by said defective portion information, jumping said defective portion to a position of said normal record area following said defective portion;

writing into a second memory a portion of said video signal having a predetermined unit corresponding to a time necessary for performing said jumping step;

after completion of recording of said video signal on said normal record area, reading out said portion of said video signal from said second memory and writing said portion of said video signal into said substitution record area;

reproducing said video signal by a method comprising the steps of:

reproducing said portion of said video signal from said substitution record area and writing said portion of said video signal into a third memory;

after said reproducing step, reading out said video signal from positions of said normal record area and outputting the video signal thus read as a reproduction signal;

when said read-out position corresponds to a position identified by said defective portion information, jumping said defective portion to a position of said normal record area following said defective portion; and reading out said portion of said video signal from said third memory and outputting said portion of said video signal thus read as said reproduction signal during the latter said jumping step.

3. A video signal reproducing apparatus having a first and second memory, said apparatus for reproducing a video signal from a recording medium having a normal record area for storing a video signal recorded therein, a recording medium information record area for storing information identifying defective portions of the recording medium, and a substitution record area for storing a video signal intended to be recorded in the defective portion of the recording medium, said apparatus comprising:

reading means for reading said defective portion information from said recording medium information record area and storing said defective portion information in said first memory before said video signal is reproduced;

reproducing means for reproducing said video signal from said substitution record area and writing the video signal thus reproduced into a said second memory;

first read-out means for reading out said video signal from said normal record area and outputting the video signal thus read out as a reproduction signal;

second read-out means for reading out said video signal from said second memory and outputting said video signal from said second memory as said reproduction signal; and control means for controlling said reproducing means and said first and second read-out means so as to permit operation of said reproducing means prior to operation of said first and second read-out means and for controlling said first and second read-out means so as to permit said first read-out means to provide said reproduction signal when a reading position of said normal record area doe snot correspond to a position identified by said defective portion information and said second read-out means to provide said reproduction signal when said reading position of said normal record area corresponds to a position identified by said defective portion information.

4. A reproducing apparatus for reproducing a source signal from a recording medium having a normal record area for storing a source signal recorded therein, a recording medium information record area for storing information identifying defective portions of the recording medium, and a substitution record area for storing a source signal intended to be recorded in the defective portion of the recording medium, said apparatus comprising:

a pick-up device, moving radially along said recording medium during a reproducing operation, for reproducing said source signal from said recording medium;

a defective portion identification device for generating a defective portion identification output signal when said pick-up device is at a position along said recording medium that corresponds to a position identified by said defective portion information stored in said recording medium information record area;

a buffer memory for storing source signals reproduced from said substitute record area during a reproduction operation; and a control unit for controlling said pick-up device and said buffer memory, wherein during reproducing operation, said control unit controls said pick-up device to reproduce and store in said buffer memory said source signal recorded in said substitution record area prior to reproducing said source signal from said normal record area, and during reproduction of said source signal stored in said normal area, said control unit controlling said pick-up device to jump a defective portion of said recording medium when said defective portion identification device generates an output signal, and controlling said buffer memory to output a stored source signal corresponding to the length of time required to jump the defective portion.

5. A recording/reproducing apparatus for recording or reproducing a source signal on or from a recording medium having a normal record area for storing a source signal recorded therein, a recording medium information record area for storing information identifying defective portions of the recording medium, and a substitution record area for storing a source signal intended to be recorded in the defective portion of the recording medium, said apparatus comprising:

a pick-up device, moving radially along said recording medium during a recording or reproducing operation, for respectively recording or reproducing said source signal on or from said recording medium;

a defective portion identification device for generating a defective portion identification output signal when said pick-up device is at a position along said recording medium that corresponds to a position identified by said defective portion information store din said recording medium information record area;

a buffer memory for storing one of source signals intended to be recorded in the defective portions of said recording medium during a recording operation, and source signals intended to be reproduced from said substitute record area during a reproduction operation; and a control unit for controlling said pick-up device and said buffer memory, wherein during a recording operation said control unit controls said pick-up device to record said signal on said recording medium as said pick-up device moves along said normal record area when said defective portion identification device does not generate an output signal, said control unit controlling said buffer memory during a recording operation to record said signal in said buffer memory when said efective portion identification device generates an output signal, and wherein during a reproducing operation, said control unit controls said pick-up device to reproduce and store in said buffer memory said source signal recorded in said substitution record area prior to reproducing said source signal from said normal record area, and during reproduction of said source signal stored in said normal area, said control unit controlling said pick-up device to jump a defective portion of said recording medium when said defective portion identification device generates an output signal, and controlling said buffer memory to output a stored source signal corresponding to the length of time required to jump the defective portion.

* * * * *